US009248776B2

(12) United States Patent
Kawamura et al.

(10) Patent No.: US 9,248,776 B2
(45) Date of Patent: Feb. 2, 2016

(54) VEHICULAR LIGHT UNIT WITH MULTIPLE LIGHT SOURCES

(71) Applicant: HONDA MOTOR CO., LTD., Minato-ku, Tokyo (JP)

(72) Inventors: Kazuyuki Kawamura, Wako (JP); Masatomo Matsumoto, Wako (JP); Kazuo Aoyama, Wako (JP); Kenichi Suzuki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/315,648

(22) Filed: Jun. 26, 2014

(65) Prior Publication Data
US 2015/0009697 A1 Jan. 8, 2015

(30) Foreign Application Priority Data

Jul. 2, 2013 (JP) ................................. 2013-139092

(51) Int. Cl.
*B60Q 1/30* (2006.01)
*B60Q 1/26* (2006.01)
*B60Q 1/32* (2006.01)
*F21S 8/10* (2006.01)

(52) U.S. Cl.
CPC ............... *B60Q 1/30* (2013.01); *B60Q 1/2607* (2013.01); *B60Q 1/32* (2013.01); *F21S 48/214* (2013.01); *F21S 48/215* (2013.01)

(58) Field of Classification Search
CPC ......................................................... B60Q 1/30
See application file for complete search history.

(56) References Cited

U.S. PATENT DOCUMENTS

| 6,095,663 A | * | 8/2000 | Pond et al. ..................... 362/247 |
| 6,533,445 B1 | * | 3/2003 | Rogers ........................... 362/540 |
| 8,235,569 B2 | | 8/2012 | Chambers et al. | |

FOREIGN PATENT DOCUMENTS

| JP | 63-072803 U | 5/1988 |
| JP | 2013503454 A | 1/2013 |
| JP | 2014103061 A | 6/2014 |

OTHER PUBLICATIONS

Office Action dated Dec. 19, 2014 and partial English translation thereof issued in the corresponding Japanese application 2013-139092.

* cited by examiner

*Primary Examiner* — Joseph L Williams
(74) *Attorney, Agent, or Firm* — Carrier Blackman & Associates, P.C.; Joseph P. Carrier; Anne G. Sabourin

(57) ABSTRACT

A vehicular lighting unit includes: a first light source in the form of an LED for providing illumination forward or rearward of a vehicle body, the first light source being mounted on one surface of a base plate in an orientation corresponding to the direction of the illumination; a second light source in the form of an LED for providing illumination laterally outward of the vehicle body, the second light source being mounted on another surface of the base plate; and a reflection section provided near the second light source for reflecting light emitted from the second light source laterally outward of the vehicle body.

1 Claim, 5 Drawing Sheets

US 9,248,776 B2

VEHICULAR LIGHT UNIT WITH MULTIPLE LIGHT SOURCES

FIELD OF THE INVENTION

The present invention relates to an improved vehicular lighting unit.

BACKGROUND OF THE INVENTION

Among the conventionally-known vehicular lighting units is one disclosed in Japanese Utility Model Application Laid-open Publication No. SHO-63-72803. A rear lamp unit disclosed in the No. SHO-63-72803 publication includes a tail and stop lamp as a light source mounted to a lamp case. The tail and stop lamp is mounted obliquely outward with respect to a front-rear direction of the vehicle, and thus, the tail and stop lamp can provide illumination both rearward of the vehicle body and laterally outward of the vehicle body. Namely, the rear lamp unit functions also as a side marker light.

The vehicular lighting unit is designed to allow a person outside the vehicle (outside person) to visually recognize presence of the vehicle. As one approach to effectively allow an outside person to visually recognize the vehicle, it may be conceivable to increase the number of the tail and stop lamp to thereby provide more intense (lighter) illumination. However, merely increasing the number of the tail and stop lamp would undesirably result in an increase in size of the vehicular lighting unit.

SUMMARY OF THE INVENTION

In view of the foregoing prior art problems, it is an object of the present invention to provide an improved vehicular lighting unit which can achieve an increased visibility while suppressing or minimizing an increase in its size.

In order to accomplish the above-mentioned object, the present invention provides an improved vehicular lighting unit, which comprises: a first light source in the form of an LED for providing illumination forward or rearward of a vehicle body, the first light source being mounted on one surface of a base plate in an orientation corresponding to the direction of the illumination: a second light source in the form of an LED for providing illumination laterally outward of the vehicle body, the second light source being mounted on another surface of the base plate; and a reflection section provided near the second light source for reflecting light emitted from the second light source laterally outward of the vehicle body.

According to the present invention, the first light source is mounted on the one surface of the base plate, the second light source is mounted on the other surface of the base plate, and light emitted the second light source is reflected from the reflection section laterally outward of the vehicle body. Because the first light source and the second light, source are mounted on the same or common base plate, the present invention can prevent the vehicular light unit from increasing in size even where the number of the light sources is increased. Further, the reflection section only has to reflect the emitted light of the second light source laterally outward of the vehicle body. Such a reflection section can be provided in a very small space within the vehicular light unit. Thus, even in the case where the reflection section is provided as above, the present invention can suppress or minimize an increase in size of the light unit. Further, the first light source for providing illumination forward or rearward of the vehicle body and the second light source for providing illumination laterally outward of the vehicle body are provided individually or separately one another. Because the illumination in various directions is provided by the individual light sources, the present invention can increase the visibility of the light unit. Because of the foregoing arrangements, the vehicular light unit of the invention is capable of increasing its visibility while suppressing or minimizing an increase in its size.

In an embodiment, the vehicular lighting unit of the invention further comprises: a third light source for providing illumination in the same direction as the first light source; and a third-light-source reflector for reflecting light emitted from the third light source, the reflection section being constructed of an integral extension of the third-light-source reflector. That is, the reflection section is formed integrally on the third-light-source reflector. Thus, the present invention can reduce the number of necessary component parts.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE INVENTION

In the following description, the terms "left" and "right" are used to refer to directions as viewed from a vehicle occupant of a vehicle, and the terms "front", "forward", "rear" and "rearward" are used to refer to directions as viewed in a front-rear direction of the vehicle.

Figure 1:
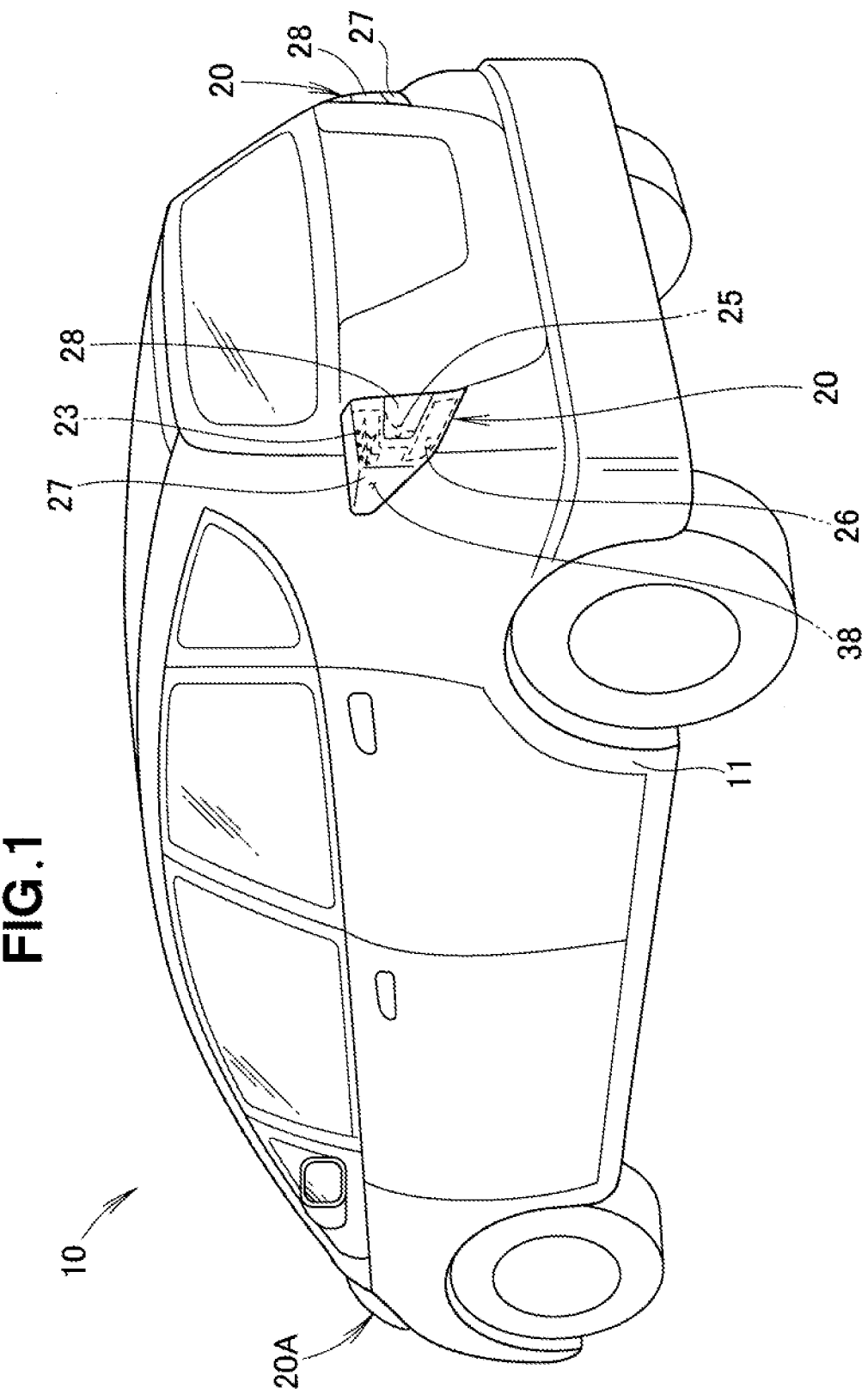
FIG. 1 is a perspective view of a vehicle on which is mounted a rear lamp unit constructed according to an embodiment of the present invention.

As shown in FIG. 1, left and right, rear lamp units 20 (vehicular lighting units 20) are mounted on a rear section of a vehicle body 11 constituting a framework of a vehicle 10.

The left and right rear lamp units 20 are disposed in left-right symmetric relation to each other and identical to each other in fundamental construction. Therefore, the following paragraphs representatively describe in detail the left rear lamp unit 20 with a detailed description about the right rear lamp unit 20 omitted.

Figure 2:
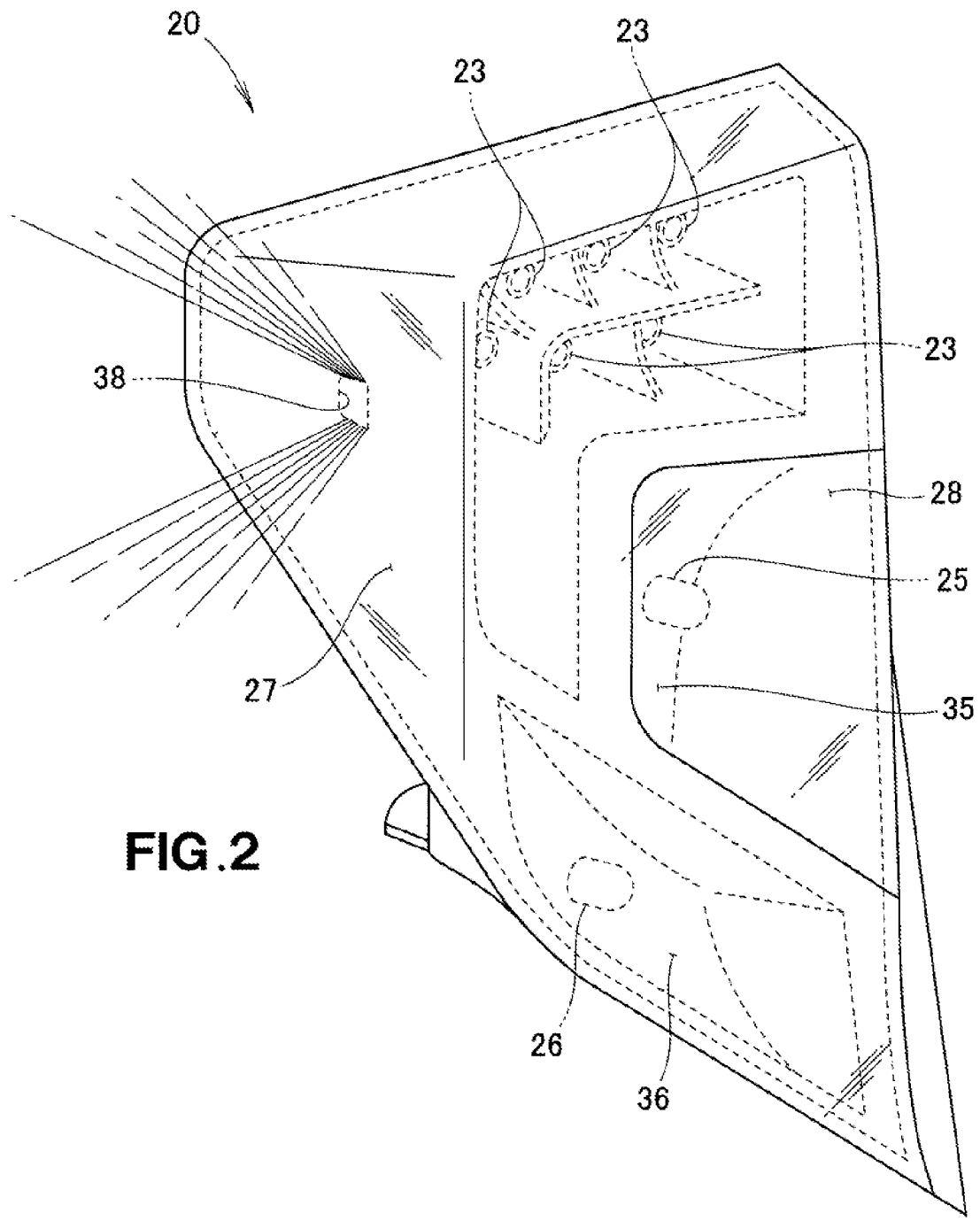
FIG. 2 is a perspective view of the rear lamp unit shown in FIG. 1.
Figure 3:
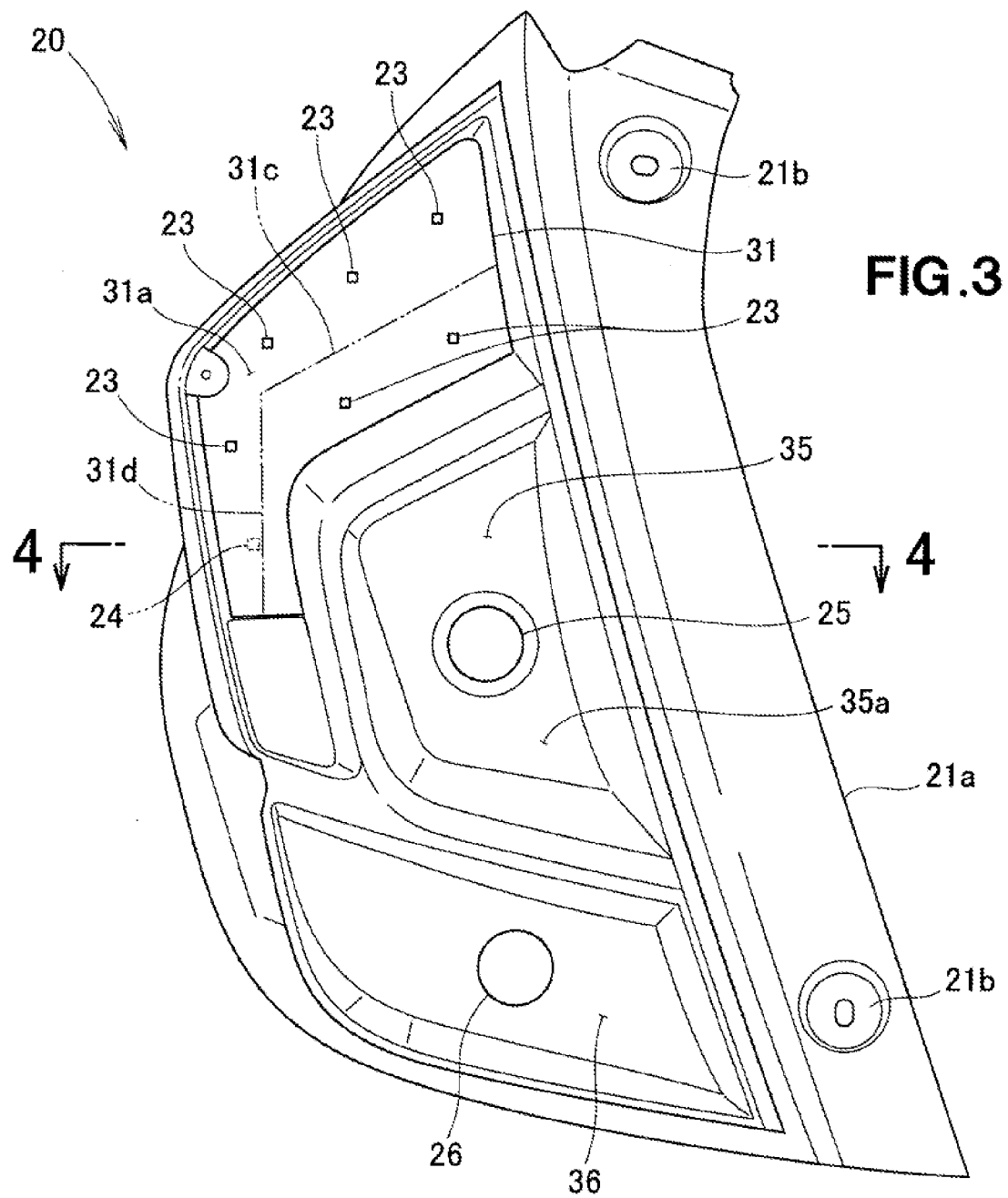
FIG. 3 is a front view of the rear lamp unit with outer lenses shown in FIG. 2 detached therefrom.

In the rear lamp unit 20, as shown in FIGS. 2 and 3, first to fourth light sources 23 to 26 of different types are accommodated in a lamp unit casing 21, and these first to fourth light sources 23 to 26 are covered with first and second outer lenses 27 and 28.

The lamp unit casing 21 has a mounting section 21*a* formed thereon in a vertical or up-down direction along its inner end edge (i.e., inner end edge as viewed in a vehicle width direction). The mounting section 21*a* has mounting holes 21*b* formed in upper and lower end portions thereof. The rear lamp unit 20 is fixedly fastened to the vehicle body 11 by means of fastener members passed through the mounting holes 21b into fixed engagement with the vehicle body.

More specifically, six first light sources 23 are accommodated in an upper portion of the lamp unit casing 21. Each of the first light sources 23 is mounted on the rear surface (one surface) 31a of a substantially-L-shaped base plate 31 and oriented in a direction where it provides illumination, i.e., mounted on the rear surface 31a in a rearward orientation corresponding to the rearward illumination. Each of the first light sources 23 is turned on or illuminated in response to an operation of a switch provided inside the vehicle and illuminated more intensely (i.e., with an increased illumination intensity). Namely, the first light sources 23 are tail and stop lamps that illuminate an area located rearward of the vehicle, i.e. that provide illumination rearward of the vehicle body. LEDs are used as the first light sources 23.

The second light source 24 is mounted on the front surface (another surface) 31b of the same base plate 31 as the first light sources 23, and the second light source 24 is oriented forward of the vehicle; that is, the second light source 24 is mounted on the front surface 31b in a forward orientation. The second light source 24 is a side marker lamp or light that is provided for allowing any outside person to visually recognize the vehicle by providing illumination laterally outward of the vehicle body. An LED is used as the second light source 24. The reason why the second light source 24 mounted on the front surface 31b of the same base plate 31 in a forward orientation can provide illumination laterally outward of the vehicle body will be discussed later.

The third light source 25 is accommodated in a central portion of the lamp unit casing 21 in a rearward orientation. The third light source 25 is a backlight that is turned on when the vehicle is moved rearward. An electric light bulb is used as the third light source 25. An outer peripheral portion of the third light source 25 is covered with a third-light-source reflector 36 for reflecting light, emitted from the third light source 25, rearward of the vehicle.

The fourth light source 26 is accommodated in a lower portion of the lamp unit casing 21 in a rearward orientation. The fourth light source 26 is a turn signal lamp that blinks in response to an operation of a winker lever provided inside the vehicle. An electric light bulb is used as the fourth light source 26. An outer peripheral portion of the fourth light source 26 is covered with a fourth-light-source reflector 38 for reflecting light, emitted from the fourth light source 26, rearward of the vehicle.

The first outer lens 27 has a substantially U shape and covers the rear surfaces of the parts having the first light sources 23, second light source 24 and fourth light source 26 mounted thereon. The first outer lens 27 is welded to the lamp unit casing 21.

The second lens 28 has a substantially rectangular shape and has its upper portion, left side portion (i.e., side portion closer to the outside of the vehicle) and lower portion surrounded with the first outer lens 27. The second outer lens 28 is also welded to the lamp unit casing 21.

Further, the first and second outer lenses 27 and 28 may comprise three or more lenses, or only one transparent lens. Namely, the outer lens may be constructed in any suitable manner rather than being limited to the two-lens structure.

The base plate 31, having the first and second light sources 23 and 24 mounted thereon, has one side 31c extending toward the vehicle with direction, and another side 31d extending downward from the outer end, in the vehicle with direction, of the one side 31c. The first light sources 23 are mounted on a portion of the base plate 31 corresponding to the one side 31c, and the second light source 24 is mounted on a portion of the base plate 31 corresponding to the other side 31d. Note that, in order to increase the visibility of the first light sources 23, an additional first light source 23 may be mounted on the portion of the base plate 31 corresponding to the other side 31b.

Figure 4:
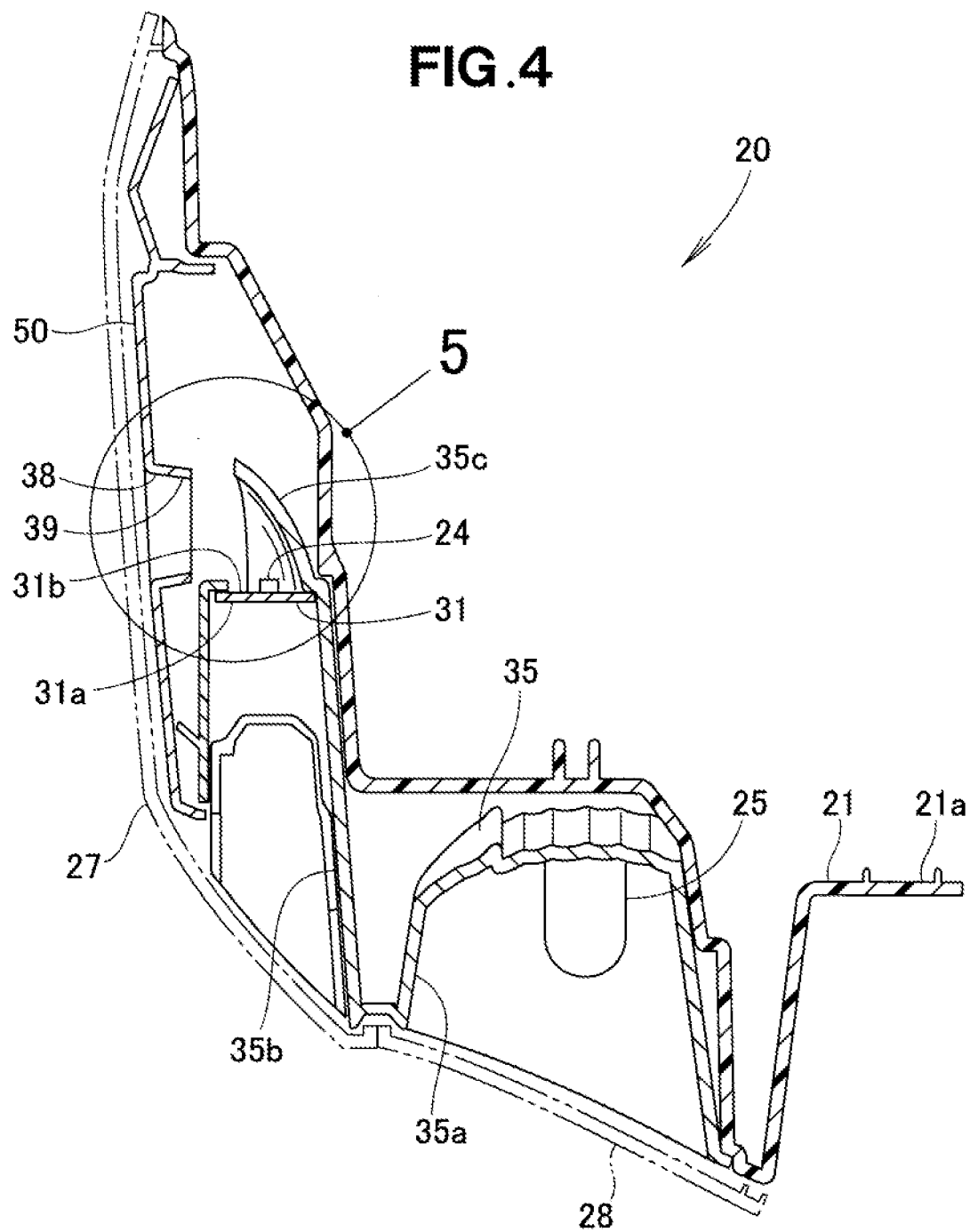
FIG. 4 is a sectional view taken along line 4-4 of FIG. 3.

As viewed in a sectional plan view of FIG. 4, the third-light-source reflector 35 includes: a body section 35a surrounding the outer periphery of the third light source 25 in a substantially U shape; an extension section 35b extending forward from the outer end of the body section 35a; and a reflection section 35c curved obliquely laterally outward from the front end of the extension section 35b for reflecting light emitted from the second light source 24 laterally outward of the vehicle body.

The reflection section 35c extends forward beyond the front surface 31b of the base plate 31. Thus, the reflection section 35c not only covers the front of the second light source 24 but also defines an open space that opens laterally outward. As viewed in the sectional plan view of FIG. 4, the reflection section 35c is curved laterally outward in an arcuate shape.

Figure 5:
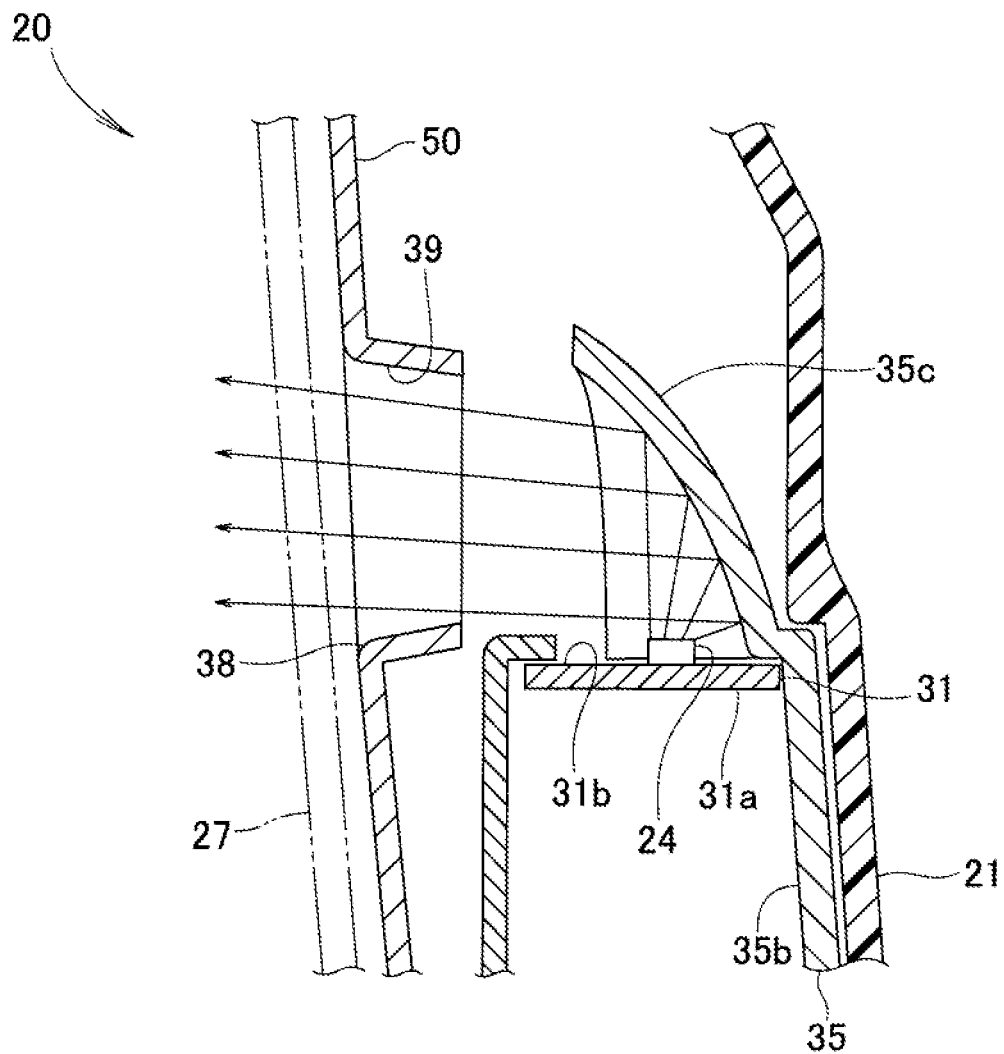
FIG. 5 is an enlarged view of a section encircled at 5 in FIG. 4.

Further, as shown in FIG. 5 that is an enlarged view of a section encircled at 5 in FIG. 4, an outer wall section 50 of the lamp unit 20 has an opening portion 38 formed in a region thereof positionally corresponding to the second light source 24 and the reflection section 35c, and a blind portion 39 formed integrally with the opening portion 38 and projecting inward from the edge of the opening portion 38 to prevent someone from peeping into an interior portion of the lamp unit 20 around the opening portion 38. As viewed in FIG. 5, i.e. a sectional plan view of the vehicular lighting unit 20, the blind portion 39 has a shape tapering inward in the vehicle width direction. The blind portion 39 has such a tapering shape also in a sectional side view of the vehicular lighting unit 20.

The blind portion 39 functions also as a guide for reliably reflecting emitted light from the second light source 24 laterally outward of the vehicle body. Namely, a portion of the light emitted from the second light source 24 is reflected from the blind portion 39 so as to be directed laterally outward of the vehicle body.

As also seen in FIG. 2, the first light sources 23 are mounted on the rear surface (one surface) 31a of the L-shaped base plate 31, the second light source 24 is mounted on the front surface (other surface) 31b of the base plate 31, and light emitted the second light source 24 is reflected from the reflection section 35 laterally outward of the vehicle body 11 (FIG. 1). Because the first light sources 23 and the second light source 24 are mounted on the same or common base plate 31, it is possible to prevent the rear lamp unit 20 from increasing in size even where the number of the light sources is increased. Further, the reflection section 35c only has to reflect the emitted light of the second light source 24 laterally outward of the vehicle body. Such a reflection section 35c can be provided in a very small space within the rear lamp unit 20. Thus, even where the reflection section 35c is provided as above, it is possible to suppress or minimize an increase in size of the rear lamp unit 20. Further, the first light sources 23 for providing illumination forward or rearward of the vehicle body and the second light source 24 for providing illumination laterally outward of the vehicle body are provided individually or separately one another. Because the illumination in various directions is provided by the individual light sources, it is possible to increase the visibility of the rear lamp unit 20. Because of the foregoing, the rear lamp unit 20 is capable of increasing its visibility while suppressing or minimizing an increase in its size.

Further, the reflection section 35c is constructed of an integral extension of the third-light-source reflector 35 that reflects light emitted from the third light source 25; that is, the reflection section 35c is formed as an integral extension of the third-light-source reflector 35. Thus, it is possible to reduce the number of necessary component parts.

Whereas the vehicular lighting unit of the present invention has been described above as embodied as a rear lamp unit, the basic principles of the present invention are also applicable to a headlamp unit (20A in FIG. 1), i.e. a lamp unit where an area in front of the vehicle is illuminated by the first light sources. Further, the present invention is applicable to various types of vehicular lighting units rather than being limited to rear lamp units and headlamp units.

It should be appreciated that the basic principles of the vehicular lighting unit are particularly well suited for application as rear lamp units.

What is claimed is:

1. A vehicular lighting unit comprising:

a base plate having a first surface and a second surface opposite to the first surface;

a first light source in a form of an LED for providing illumination forward or rearward of a vehicle body, the first light source being mounted on the first surface of the base plate in an orientation corresponding to a direction of the illumination;

a second light source in a form of an LED for providing illumination laterally outward of the vehicle body, the second light source being mounted on the second surface of the base plate;

a reflection section provided near the second light source for reflecting light emitted from the second light source laterally outward of the vehicle body;

a third light source for providing illumination in a same direction as the first light source; and a third-light-source reflector for reflecting light emitted from the third light source, the reflection section being constructed of an integral extension of the third-light-source reflector.

* * * * *